United States Patent
Sato et al.

(10) Patent No.: US 8,476,784 B2
(45) Date of Patent: Jul. 2, 2013

(54) WIND TURBINE GENERATING APPARATUS

(75) Inventors: Shinsuke Sato, Tokyo (JP); Shigeto Hirai, Tokyo (JP); Tatsuo Ishiguro, Tokyo (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 0 days.

(21) Appl. No.: 13/252,468

(22) Filed: Oct. 4, 2011

(65) Prior Publication Data

US 2012/0074711 A1 Mar. 29, 2012

Related U.S. Application Data (63) Continuation of application No. PCT/JP2011/064823, filed on Jun. 28, 2011.

(30) Foreign Application Priority Data

Jun. 30, 2010 (JP) .................................. 2010-150582

(51) Int. Cl.
   *F03D 9/00* (2006.01)
(52) U.S. Cl.
   USPC .............. 290/55; 415/4.1; 415/115; 415/908; 416/97 R; 416/DIG. 4
(58) Field of Classification Search
   USPC ................. 290/44, 55; 415/115, 116; 416/95, 416/96 R, 96 A, 97 R, 97 A
   See application file for complete search history.

(56) References Cited

U.S. PATENT DOCUMENTS

| 6,676,122 | B1 * | 1/2004 | Wobben ......................... 290/55 |
| 7,365,447 | B2 | 4/2008 | Yoshida |
| 8,053,918 | B2 * | 11/2011 | Wobben ......................... 290/55 |
| 8,308,434 | B2 * | 11/2012 | Numajiri ........................ 416/95 |
| 2005/0242233 | A1 * | 11/2005 | Battisti ......................... 244/58 |
| 2009/0060748 | A1 * | 3/2009 | Landa et al. ................ 416/93 R |
| 2010/0061853 | A1 * | 3/2010 | Bagepalli ....................... 416/95 |
| 2010/0148514 | A1 * | 6/2010 | Sato et al. ....................... 290/55 |
| 2011/0103950 | A1 * | 5/2011 | Pesetsky et al. ................. 416/1 |
| 2011/0217169 | A1 * | 9/2011 | Becker ............................ 416/95 |
| 2011/0304149 | A1 * | 12/2011 | Pasteuning et al. ............ 290/55 |
| 2012/0025541 | A1 * | 2/2012 | Hirai et al. ..................... 290/55 |

FOREIGN PATENT DOCUMENTS

| JP | 2001-526357 A | 12/2001 |
| JP | 2005-069082 A | 3/2005 |
| JP | 2007-002773 A | 1/2007 |

(Continued)

OTHER PUBLICATIONS

International Search Report for PCT/JP2011/064823 mailed Sep. 13, 2011.

*Primary Examiner* — Tulsidas C Patel
*Assistant Examiner* — Viet Nguyen
(74) *Attorney, Agent, or Firm* — Kanesaka Berner & Partners, LLP (57) ABSTRACT

In a wind turbine generating apparatus, a heat generating device is provided inside the rotor head and has a hermetically-sealed structure from outside. A rotor head cooling air passage is formed through the periphery of the heat generating device to the inside of a wind turbine blade. A cooling air introduction portion through which cooling air flows and an air outlet from which the cooling air is discharged are provided in the rotor head cooling air passage to thereby form the air outlet in the wind turbine blade.

6 Claims, 7 Drawing Sheets

| | FOREIGN PATENT DOCUMENTS | | |
|---|---|---|---|
| JP | 2007-113518 A | 5/2007 | |
| WO | 99-30031 A1 | 6/1999 | |
| WO | 2009-044843 A1 | 4/2009 | |

* cited by examiner

WIND TURBINE GENERATING APPARATUS

CROSS-REFERENCE TO RELATED APPLICATIONS

This application is based on Japanese Patent Application No. 2010-150582, the contents of which are incorporated herein by reference.

TECHNICAL FIELD

The present invention relates to a wind turbine generating apparatus which cools down heat generated by devices during operation by introducing outside air.

BACKGROUND ART

A typical wind turbine generating apparatus is an apparatus which generates electricity by causing a rotor head with wind turbine blades to rotate upon receiving wind power, increasing the speed of rotation by a gear box, and thereby driving a generator. The rotor head is attached at an end portion of a nacelle that is installed on a tower erected on the ground or the like so as to be movable in a yaw direction. The rotor head is supported rotatably around a rotational axis in a substantially-horizontal lateral direction.

Heat generating devices including the generator are installed inside the nacelle. Heat generating devices such as a converter and a transformer are installed inside the tower. Thus, it is necessary to appropriately cool down the electric devices to keep stable operation. A wind turbine generating apparatus which introduces outside wind into a tower or a nacelle as cooling air has been proposed.

A pitch drive device is incorporated in the rotor head to adjust the pitch angle of the wind turbine blade to an optimum angle based on the air volume. Since the pitch drive device also generates heat during operation, the pitch drive device needs to be appropriately cooled down. For example, Patent Literature 1 discloses a wind turbine generating apparatus which employs a double-walled structure inside a rotor head, cools down a heat generating device installed inside an inner wall portion by introducing outside air from outside the rotor head into the inner wall portion, and discharges the air used for cooling to outside through the inside of a wind turbine blade.

CITATION LIST

Patent Literature

{PTL 1}
U.S. Patent Application No. 2009/0060748 A1

SUMMARY OF INVENTION

Technical Problem

However, the wind turbine generating apparatus in Patent Literature 1 has a structure in which outside air is directly in contact with the heat generating device installed inside the rotor head. Thus, corrosion or contamination easily occurs in devices inside the rotor head due to foreign substances such as moisture, salt content, and dust contained in the outside air, which is mechanically and electrically not preferable. To improve the problem, a filter for removing foreign substances needs to be provided in an introduction portion of outside air.

A pressure loss is caused when the filter is installed. Thus, a sufficient volume of outside air cannot be introduced.

The present invention has been made in view of the aforementioned circumstances, and it is an object of the present invention to provide a wind turbine generating apparatus which can satisfactorily cool down heat generating devices installed inside a rotor head, and can protect the devices against corrosion or contamination with a simple configuration.

Solution to Problem

To solve the above problem, the present invention employs the following solutions.

That is, a wind turbine generating apparatus according to the present invention is a wind turbine generating apparatus which generates electricity by causing a rotor head to rotate upon receiving outside wind on a wind turbine blade and thereby driving a generator that is installed inside a nacelle supported on a top of a tower, wherein the rotor head includes a rotor hub which supports the wind turbine blade rotatably in a pitch direction, and a hub cover which covers the rotor hub, and the wind turbine blade includes a communication port which is provided so as to communicate between an interior space between the rotor hub and the hub cover and an interior space of the wind turbine blade, and an air outlet which communicates between the interior space of the wind turbine blade and outside, and further includes a rotor head cooling air passage which communicates between the communication port and the air outlet, and a cooling air introduction portion which allows outside air to flow into the rotor head cooling air passage.

With the wind turbine generating apparatus, a negative pressure is applied to the air outlet when the wind turbine blade rotates. Air inside the rotor head cooling air passage is suctioned by the negative pressure, and discharged from the air outlet. Cooling air is thereby newly introduced into the rotor head cooling air passage from the cooling air introduction portion, to cool down a heat generating device installed inside the rotor hub. The air used for cooling is discharged outside from the air outlet of the wind turbine blade. With such a simple configuration, the heat generating device (the rotor hub) can be satisfactorily cooled down while employing a hermetically-sealed structure therein. The heat generating device is prevented from directly contacting outside air, and can be thereby protected against corrosion or contamination.

In the wind turbine generating apparatus according to the present invention, air feeding part which feeds cooling air into the rotor head cooling air passage may be provided. By providing the air feeding part, the flow rate and the flow speed of the cooling air that flows through the rotor head cooling air passage can be increased to improve the cooling efficiency of the heat generating device.

In the wind turbine generating apparatus according to the present invention, heat dissipation assisting part which assists dissipation of heat of the rotor hub into cooling air that flows through the rotor head cooling air passage may be provided on an outer surface of the rotor hub. Accordingly, the heat of the heat generating device can be actively dissipated into the cooling air to improve the cooling efficiency.

In the wind turbine generating apparatus according to the present invention, the air outlet may be formed on a leeward side of the wind turbine blade to a wind direction. The negative pressure applied to the air outlet is thereby increased. The flow rate and the flow speed of the cooling air that flows through the rotor head cooling air passage can be increased to improve the cooling efficiency of the heat generating device.

In the wind turbine generating apparatus according to the above configuration, the air outlet may be formed in the vicinity of a root of the wind turbine blade. Accordingly, the entire length of the rotor head cooling air passage can be reduced to avoid a pressure loss, and the flow speed and the flow rate of the cooling air can be increased to improve the cooling efficiency.

In the wind turbine generating apparatus according to the present invention, the rotor head cooling air passage may communicate with a nacelle interior air passage which cools inside of the nacelle, and cooling air passing through the nacelle interior air passage may be discharged outside through the rotor head cooling air passage. With the present configuration, the inside of the nacelle and the inside of the rotor head can be totally cooled down. Thus, the cooling structure of the entire wind turbine generating apparatus can be simplified.

In the wind turbine generating apparatus according to the present invention, the rotor head cooling air passage may communicate with a nacelle interior air passage which cools inside of the nacelle and a tower interior air passage which cools inside of the tower where the nacelle is installed at an upper end portion, and cooling air passing through the tower interior air passage and the nacelle interior air passage may be discharged outside through the rotor head cooling air passage. With the present configuration, the inside of the tower, the inside of the nacelle and the inside of the rotor head can be totally cooled down. Thus, the cooling structure of the entire wind turbine generating apparatus can be simplified.

Advantageous Effects of Invention

As described above, with the wind turbine generating apparatus according to the present invention, the heat generating devices installed inside the rotor head can be satisfactorily cooled down, and the devices can be protected against corrosion or contamination with a simple configuration.

DESCRIPTION OF EMBODIMENTS

In the following, embodiments of a wind turbine generating apparatus according to the present invention will be described based on the drawings.

Figure 1:
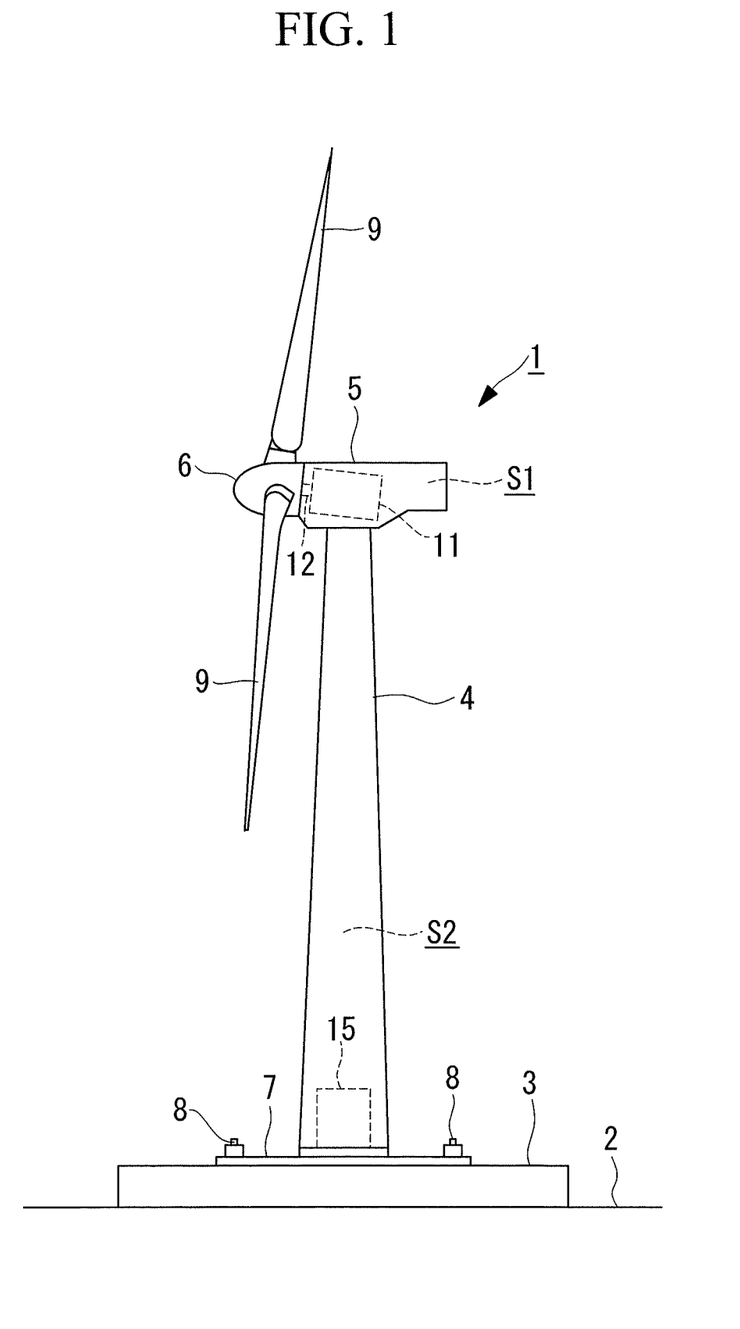
FIG. 1 is a side view illustrating one example of a wind turbine generating apparatus to which each embodiment of the present invention is applicable.

FIG. 1 is a side view illustrating one example of a wind turbine generating apparatus to which cooling structures A to F in the respective embodiments described below are applicable. The wind turbine generating apparatus 1 includes a tower 4 that is erected on a reinforced concrete foundation 3 installed on a ground 2, a nacelle 5 that is installed at an upper end portion of the tower 4, and a rotor head 6 that is provided on the front end side of the nacelle 5 so as to be supported rotatably around a rotational axis in a substantially-horizontal lateral direction. In the example, a so-called up-wind wind turbine where the rotor head 6 is provided on the front end side of the nacelle 5 will be described. It will be obvious to a person skilled in the art that the present invention may be also applied to a down-wind wind turbine where the rotor head 6 is provided on the rear end side of the nacelle 5.

The tower 4 is a steel pipe monopole type, and has a substantially circular shape in cross section. A base plate 7 made of steel, for example, is fixed to a lower end portion of the tower 4. The base plate 7 is fastened to the foundation 3 by a plurality of anchor bolts 8. A plurality of (for example, three) wind turbine blades 9 are attached to the rotor head 6 so as to radially extend. A generator 11 is accommodated inside the nacelle 5. A rotational shaft 12 of the rotor head 6 is connected to a main shaft of the generator 11 via a gear box 13 (see FIG. 2). Thus, the wind force of outside wind that collides with the wind turbine blades 9 is converted into a rotational force to rotate the rotor head 6 and the rotational shaft 12. The generator 11 is thereby driven to generate electricity.

The nacelle 5 can turn in a horizontal direction at the upper end of the tower 4 together with the wind turbine blades 9. A drive device and a control device (not shown) control the nacelle 5 to be always directed windward to thereby effectively generate electricity. Various heat generating devices such as a main bearing and a gear box (not shown) in addition to the generator 11 are installed in an interior space S1 of the nacelle 5. A rotor hub 14 (see FIG. 2) is provided inside the rotor head 6. The rotor hub 14 incorporates therein a well-known hydraulic or electric pitch drive device, a control panel or the like for adjusting the pitch angle of the wind turbine blade 9 to an optimum angle based on the air volume. The pitch drive device and the control panel are also heat generating devices which generate heat during operation. Various electric devices 15 are also installed in an interior space S2 of the tower 4. Examples of the electric devices 15 include a converter and a transformer which generate heat.

Since the interior space S1 of the nacelle 5 and the interior space S2 of the tower 4 are hermetically closed, cooling structures A to F in the respective embodiments described below are employed to cool down the heat generating devices 11, 14 and 15 installed in the interior spaces S1 and S2 and in the rotor head 6.

First Embodiment

Figure 2:
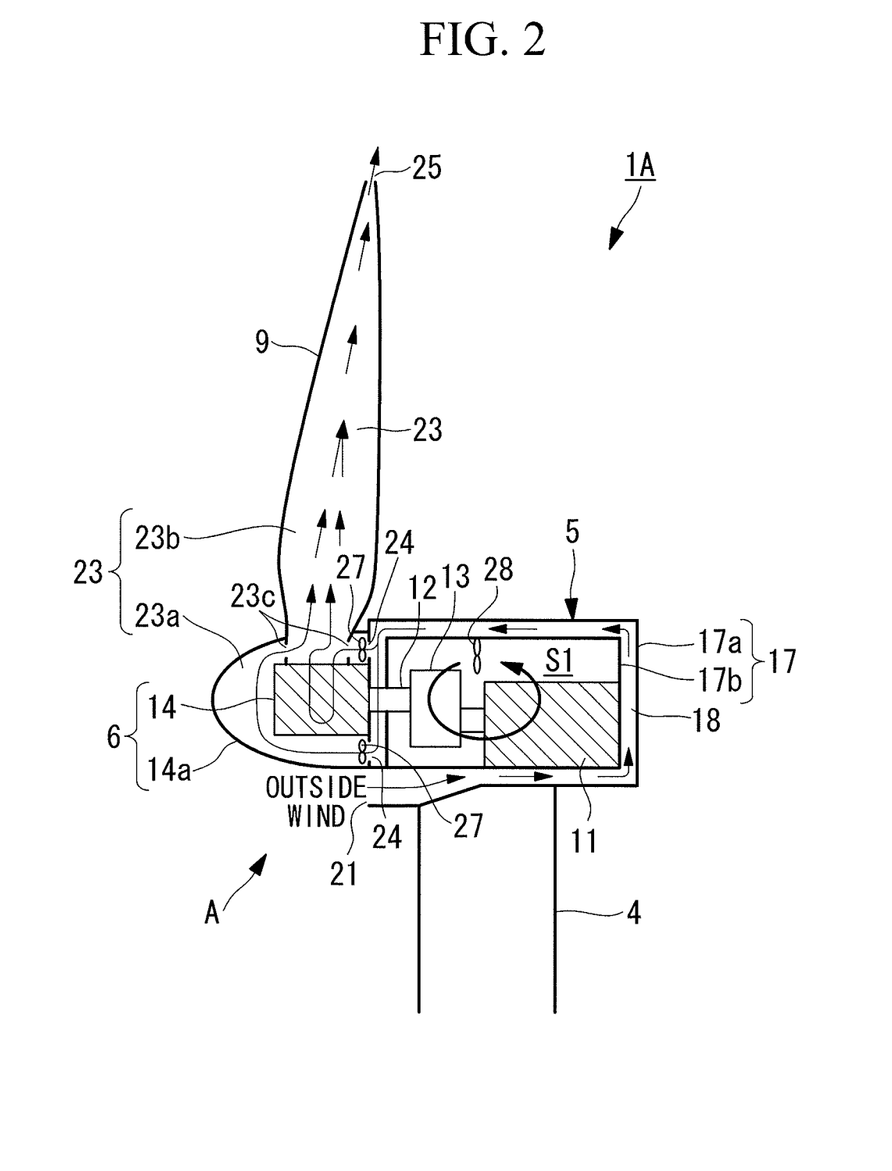
FIG. 2 is a schematic vertical sectional view of a wind turbine generating apparatus according to a first embodiment of the present invention.

FIG. 2 is a schematic vertical sectional view of a wind turbine generating apparatus 1A according to a first embodiment of the present invention. The wind turbine generating apparatus 1A includes a cooling structure A. In the cooling structure A, a wall body 17 constituting the nacelle 5 has a double-walled structure with an outer wall 17a and an inner wall 17b provided inside the outer wall 17a with a space therebetween, for example. The space between the outer wall 17a and the inner wall 17b is employed as a nacelle interior air passage 18. Outside air flows through the nacelle interior air passage 18 as cooling air. Although the entire wall body 17 has the double-walled structure, the wall body 17 may be partially double-walled.

The nacelle interior air passage 18 is completely isolated from the interior space S1 of the nacelle 5. The generator 11 installed as the heat generating device in the interior space S1 is provided adjacent to the nacelle interior air passage 18. To be more specific, the generator 11 is provided in close contact with the bottom surface and the rear surface of the inner wall 17b that constitutes the nacelle interior air passage 18.

The nacelle interior air passage 18 includes an outside wind inlet 21 for introducing outside wind that blows from the front side of the nacelle 5. The outside wind inlet 21 is provided so as to open toward the front side at a position immediately below the rotor head 6 and, if necessary, at right and left side positions of the rotor head 6 in the front surface of the nacelle 5, for example. The opening area of the outside wind inlet 21 is set to be larger than the vertical sectional area of the nacelle interior air passage 18. The passage area of the nacelle interior air passage 18 is gradually reduced from the outside wind inlet 21 to the downstream side as viewed from the side.

Meanwhile, the rotor head 6 includes the aforementioned rotor hub 14, and a hub cover 14a for covering the rotor hub 14. The rotor hub 14 supports the wind turbine blades 9. The rotor hub 14 has a capsule structure which is hermetically sealed from outside. The pitch drive device (not shown) provided inside the rotor hub 14 is thereby shielded from outside air. A rotor head cooling air passage 23 is formed through the periphery of the rotor hub 14 and the inside of the wind turbine blade 9. An interior space 23a between the rotor hub 14 and the hub cover 14a, and an interior space 23b of the wind turbine blade are connected to each other to constitute the rotor head cooling air passage 23. The both interior spaces 23a and 23b communicate with each other via a communication port 23c that is formed in a proximal end portion of the wind turbine blade 9, for example. The interior space 23a of the rotor head 6 also communicates with the nacelle interior air passage 18 through a cooling air introduction portion 24 that is formed as an opening in the front surface of the nacelle 5.

Cooling air flows into the rotor head cooling air passage 23 from the cooling air introduction portion 24 as described below. An air outlet 25 is provided in the vicinity of the tip of the wind turbine blade 9. The cooling air inside the rotor head cooling air passage 23 is discharged outside from the air outlet 25. A blower fan 27 is also installed in the cooling air introduction portion 24. The blower fan 27 functions as air feeding part for feeding cooling air into the rotor head cooling air passage 23. The nacelle interior air passage 18 and the outside wind inlet 21 are also one type of air feeding part for feeding cooling air into the rotor head cooling air passage 23. An air blowing device such as a circulating fan 28 may be also installed in the interior space S1 of the nacelle 5 if necessary.

The cooling structure A having the aforementioned configuration is operated as described below.

When outside wind blows toward the wind turbine generating apparatus 1A, the wind direction of the outside wind is detected, and the nacelle 5 is automatically controlled to direct the front surface windward. The outside wind is thereby introduced as cooling air into the nacelle interior air passage 18 from the outside wind inlet 21 opening in the front surface of the nacelle 5 as indicated by arrows. Since the passage area of the nacelle interior air passage 18 is reduced from the outside wind inlet 21 to the downstream side, the cooling air is gradually accelerated while flowing through the nacelle interior air passage 18. The cooling air thereby cools down the generator 11 as the heat generating device that is provided in close contact with the inner wall 17b.

The cooling air passing through the nacelle interior air passage 18 is fed into the rotor head cooling air passage 23 through the cooling air introduction portion 24. The blower fan 27 provided in the cooling air introduction portion 24 helps to feed the cooling air. The cooling air fed into the rotor head cooling air passage 23 passes through the periphery of the rotor hub 14 to cool down the pitch drive device and the control panel via the rotor hub 14. The cooling air is finally discharged outside from the air outlet 25 through the inside of the wind turbine blade 9.

Since the air outlet 25 is formed in the wind turbine blade 9, a negative pressure is applied to the air outlet 25 when the wind turbine blade 9 rotates. The air inside the rotor head cooling air passage 23 is thereby suctioned out of the air outlet 25. The flow rate and the flow speed of the cooling air flowing through the nacelle interior air passage 18 and the rotor head cooling air passage 23 are increased due to the suction action and the air feeding action by the blower fan 27, to thereby effectively cool down the generator 11 and the rotor hub 14. The rotational speed or the ON/OFF state of the blower fan 27 is automatically controlled based on the temperature of the cooling air, for example. When a sufficiently high negative pressure is applied to the air outlet 25 by the rotation of the wind turbine blade 9, the blower fan 27 may not be necessarily provided.

By employing the cooling structure A, the generator 11 and the rotor hub 14 can be satisfactorily cooled down with a simple structure while employing a completely hermetically-sealed structure therein. Since the heat generating devices 11 and 14 are prevented from directly contacting outside air, the heat generating devices 11 and 14 can be effectively protected against corrosion or contamination due to foreign substances such as moisture, salt content, and dust contained in the outside air.

The rotor head cooling air passage 23 communicates with the nacelle interior air passage 18, and the cooling air passing through the nacelle interior air passage 18 is discharged outside through the rotor head cooling air passage 23. Thus, the inside of the nacelle 5 and the inside of the rotor head 6 can be totally cooled down, and the cooling structure of the entire wind turbine generating apparatus 1A can be simplified. The circulating fan 28 provided in the interior space S1 of the nacelle 5 circulates air inside the interior space S1. Thus, the heat of the generator 11 or the like is widely transferred to the inner wall 17b, to thereby increase the heat exchange effectiveness. Accordingly, the cooling performance can be improved.

Second Embodiment

Figure 3:
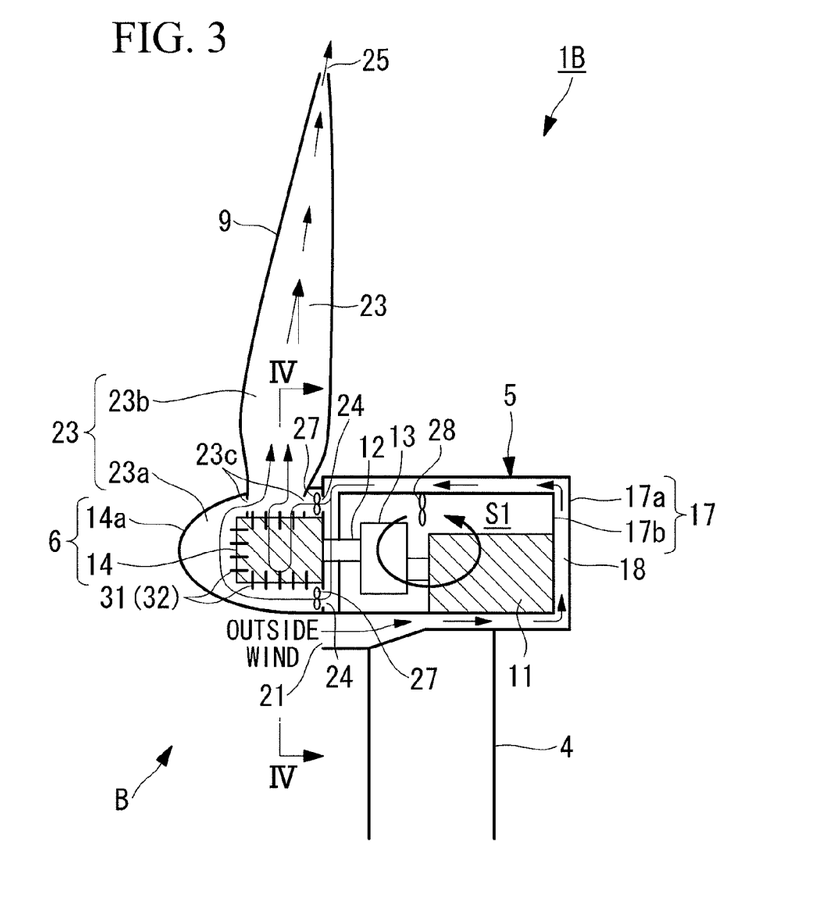
FIG. 3 is a schematic vertical sectional view of a wind turbine generating apparatus according to a second embodiment of the present invention.

FIG. 3 is a schematic vertical sectional view of a wind turbine generating apparatus 1B according to a second embodiment of the present invention. The wind turbine generating apparatus 1B includes a cooling structure B. The cooling structure B differs from the cooling structure A in the above first embodiment only in that heat dissipation assisting part for assisting dissipation of the heat generated from the rotor hub 14 into the cooling air that flows through the rotor head cooling air passage 23 is provided on the outer surface of the rotor hub 14. The other components have the same configuration. A heat pipe 31 having a well-known structure in which a working fluid such as CFC substitutes is enclosed in a copper pipe is used as an example of the heat dissipation assisting part. The heat pipe 31 is disposed on the circumferential surface and the front surface of a casing of the rotor hub 14 so as to penetrate the casing, for example.

Figure 4:
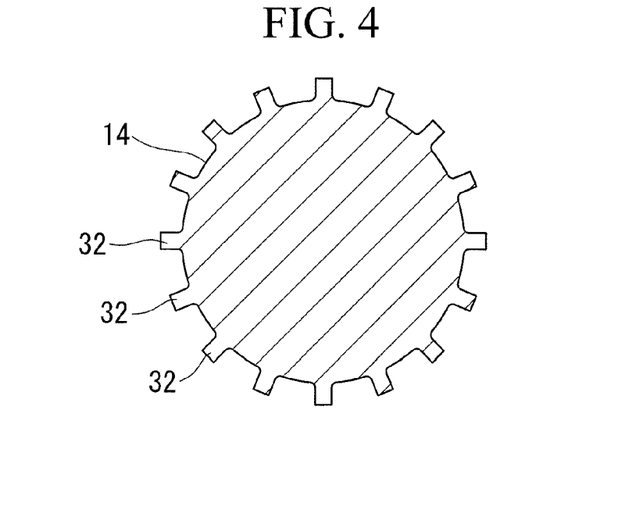
FIG. 4 is a vertical sectional view taken along a line IV-IV in FIG. 3.

Alternatively, a heat dissipation fin 32 (or rib) may be provided on the circumferential surface and the front surface of the rotor hub 14 as the heat dissipation assisting part as shown in FIG. 4, to thereby increase the surface area of the rotor hub 14. The heat dissipation fin 32 provided on the circumferential surface of the rotor hub 14 is preferably formed such that its longitudinal direction is aligned with a front-back direction. The heat dissipation fin 32 may be also provided in a spiral shape, for example, around the rotor hub 14, to thereby suction the cooling air from the cooling air introduction portion 24 by the rotation of the rotor hub 14.

In the cooling structure B, the outside wind introduced as the cooling air from the outside wind inlet 21 in the front surface of the nacelle 5 cools down the heat generated by the heat generating devices such as the generator 11 and the rotor hub 14 through the nacelle interior air passage 18 and the rotor head cooling air passage 23, and is subsequently discharged outside from the air outlet 25 in a similar manner to the cooling structure A in the first embodiment. The heat generated by the rotor hub 14 is actively transferred to the cooling air flowing through the rotor head cooling air passage 23 due to the heat transfer action of the heat pipe 31 or the heat dissipation action of the heat dissipation fin 32. Accordingly, the rotor hub 14 can be more effectively cooled down.

Third Embodiment

Figure 5:
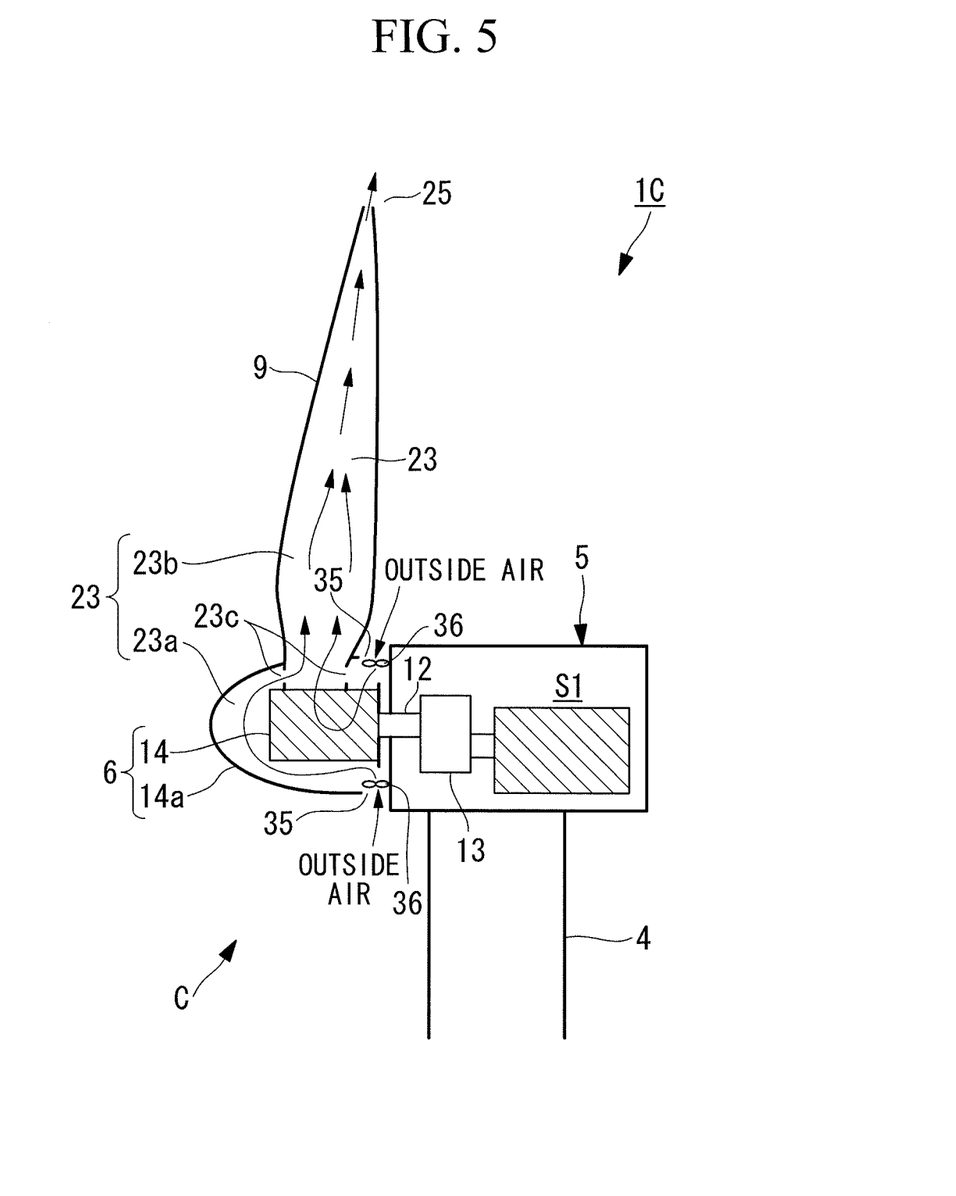
FIG. 5 is a schematic vertical sectional view of a wind turbine generating apparatus according to a third embodiment of the present invention.

FIG. 5 is a schematic vertical sectional view of a wind turbine generating apparatus 10 according to a third embodiment of the present invention. The wind turbine generating apparatus 10 includes a cooling structure C. The cooling structure C differs from the cooling structure A in the first embodiment in that the rotor head cooling air passage 23 provided inside the rotor head 6 is separated from the interior space S1 of the nacelle 5. In a similar manner to the cooling structure A, the interior space 23a of the rotor head 6 and the interior space 23b of the wind turbine blade 9 communicate with each other via the communication port 23c formed in the proximal end portion of the wind turbine blade 9 to constitute the rotor head cooling air passage 23, and the air outlet 25 is provided in the vicinity of the tip of the wind turbine blade 9.

A gap-shaped or cutaway-shaped cooling air introduction portion 35 is also provided between the rotor head 6 and the front surface of the nacelle 5 so as to introduce outside air into the rotor head cooling air passage 23. A plurality of blower fans 36 may be installed therein. The blower fan 36 is air feeding part for feeding cooling air into the rotor head cooling air passage 23. The blower fan 36 may be fixed to the nacelle 5 or the rotor head 6.

In the cooling structure C, a negative pressure is applied to the air outlet 25 by the rotation of the wind turbine blade 9. Cooling air inside the rotor head cooling air passage 23 is suctioned out of the air outlet 25. Outside air is also suctioned into the rotor head cooling air passage 23 from the cooling air introduction portion 35 as cooling air. When the blower fan 36 is operated, more outside air is fed from the cooling air introduction portion 35. As described above, the rotor hub 14 is cooled down by the cooling air that flows through the rotor head cooling air passage 23, and the air used for cooling is discharged outside from the air outlet 25.

The cooling structure C can increase the flow rate and the flow speed of the cooling air that flows through the rotor head cooling air passage 23 due to the suction action by the negative pressure applied to the air outlet 25 by the rotation of the wind turbine blade 9 and the air feeding action by the blower fan 36. The rotor hub 14 can be thereby effectively cooled down. In a similar manner to the cooling structures A and B, the cooling structure C has such an advantage that the pitch drive device and the control panel installed inside the rotor hub 14 can be protected against corrosion or contamination by preventing outside air from entering the inside of the rotor hub 14 having a hermetically-sealed structure. When a sufficiently high negative pressure is applied to the air outlet 25 by the rotation of the wind turbine blade 9, the number of blower fans 36 may be reduced, or the blower fan 36 may not be provided. However, when the blower fan 36 is provided, the rotor hub 14 can be cooled down even when the wind turbine blade 9 is not rotated.

Fourth Embodiment

Figure 6:
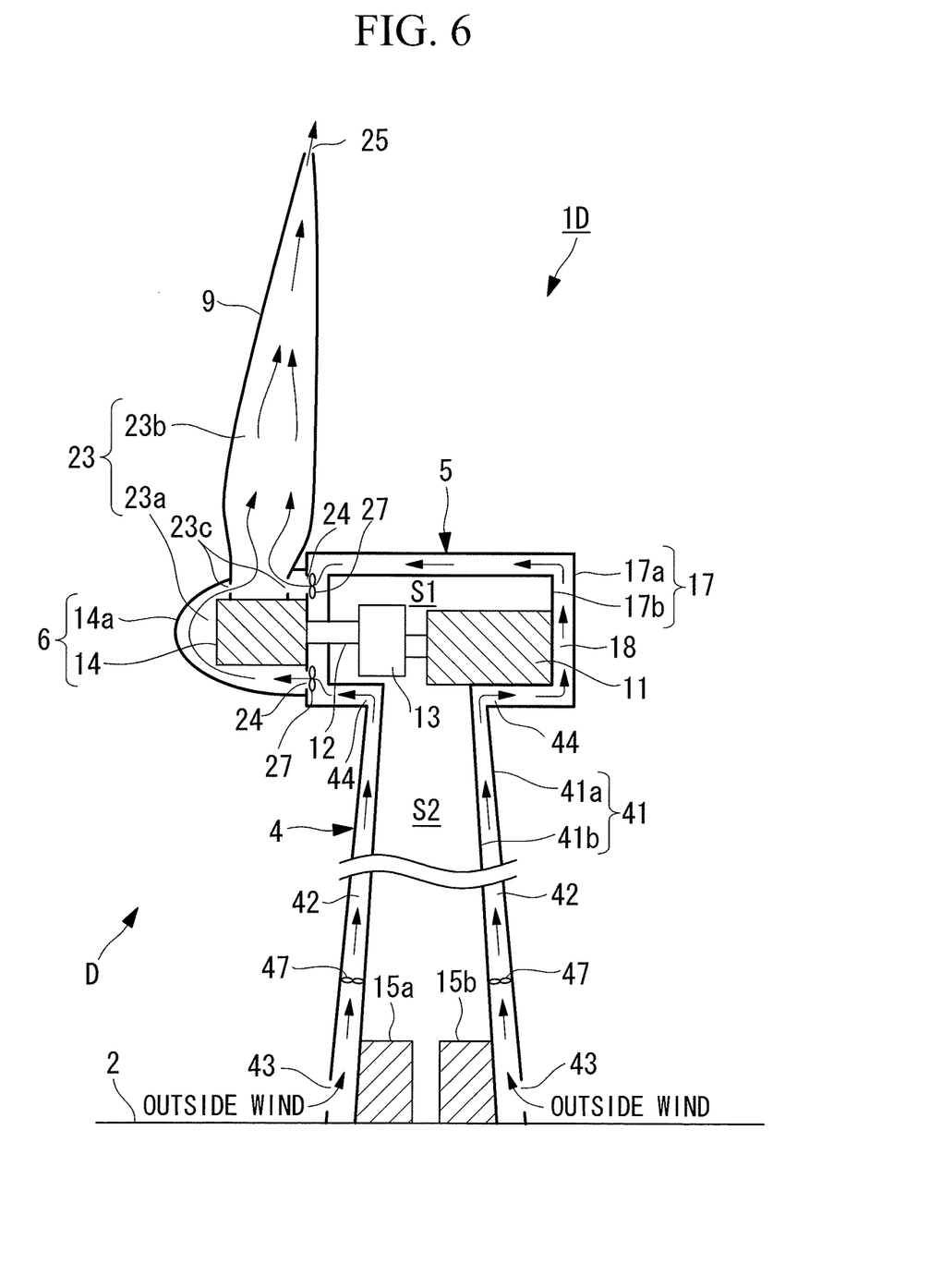
FIG. 6 is a schematic vertical sectional view of a wind turbine generating apparatus according to a fourth embodiment of the present invention.

FIG. 6 is a schematic vertical sectional view of a wind turbine generating apparatus 1D according to a fourth embodiment of the present invention. The wind turbine generating apparatus 1D includes a cooling structure D. In the wind turbine generating apparatus 1D (the cooling structure D), a wall body 41 constituting the tower 4 has a double-walled structure with an outer wall 41a and an inner wall 41b provided inside the outer wall 41a with a space therebetween. The inside of the inner wall 41b is employed as the interior space S2. The space between the outer wall 41a and the inner wall 41b is employed as a tower interior air passage 42.

The tower interior air passage 42 is isolated from the interior space S2. Heat-generating electric devices such as a converter 15a and a transformer 15b installed in the interior space S2 are provided adjacent to the tower interior air passage 42 (the inner wall 41b). Although the entire wall body 41 has the double-walled structure, a portion of the wall body 41 may be double-walled to partially provide the tower interior air passage 42. The converter 15a and the transformer 15b may be provided adjacent thereto.

One or a plurality of outside wind inlets 43 are provided in the circumferential surface of the outer wall 41a close to the ground 2, for example. Outside air is introduced therefrom into the tower interior air passage 42 as cooling air. Meanwhile, the nacelle interior air passage 18 similar to those of the cooling structures A and B in the above first and second embodiments is formed inside the nacelle 5. However, the outside wind inlet 21 as in the cooling structures A and B is not provided in the nacelle interior air passage 18, and the nacelle interior air passage 18 communicates with the tower interior air passage 42 via a communication portion 44. In a similar manner to the cooling structures A and B, the nacelle interior air passage 18 communicates with the rotor head cooling air passage 23 via the cooling air introduction portion 24, and the blower fan 27 is provided in the cooling air introduction portion 24.

The cooling structure D having the aforementioned configuration is operated as follows.

When outside wind blows toward the wind turbine generating apparatus 1D, the outside wind is introduced as cooling air into the tower interior air passage 42 from the outside wind inlet 43 as indicated by arrows, and cools down the heat-generating converter 15a and the transformer 15b provided adjacent to the tower interior air passage 42 in close contact with the inner wall 41b when flowing through the tower interior air passage 42. The cooling air subsequently rises through the tower interior air passage 42, and flows into the nacelle interior air passage 18 through the communication portion 44. In a similar manner to the above cooling structures A and B, the cooling air subsequently cools down the generator 11 as the heat generating device provided in close contact with the inner wall 17b of the nacelle 5, and flows into the rotor head cooling air passage 23 through the cooling air introduction portion 24 while being suctioned by the blower fan 27 to cool down the rotor hub 14. The cooling air is finally discharged outside from the air outlet 25 through the inside of the wind turbine blade 9.

A circulating fan 47 may be installed inside the tower interior air passage 42 if necessary. The circulating fan 47 actively feeds the cooling air flowing through the tower interior air passage 42 to the nacelle interior air passage 18 and the rotor head cooling air passage 23. The circulating fan 47 is allowed to work together with the blower fan 27 provided in the cooling air introduction portion 24 to increase the volume of cooling air. Accordingly, the cooling performance can be improved.

With the cooling structure D, not only the rotor hub 14 (the pitch drive device and the control panel) as the heat generating device provided in the rotor head 6, but also the heat generating device (the converter 15a and the transformer 15b) provided in the tower 4 and the heat generating device (the generator 11) provided in the nacelle 5 can be effectively cooled down. Since the interior space S2 of the tower 4 can be hermetically sealed, the tower internal devices including the converter 15a and the transformer 15b can be prevented from contacting outside air, and thereby protected against corrosion or contamination. With the present configuration, the inside of the tower 4, the inside of the nacelle 5, and the inside of the rotor head 6 can be totally cooled down. Accordingly, the cooling structure of the entire wind turbine generating apparatus 1D can be simplified.

Fifth Embodiment

Figure 7:
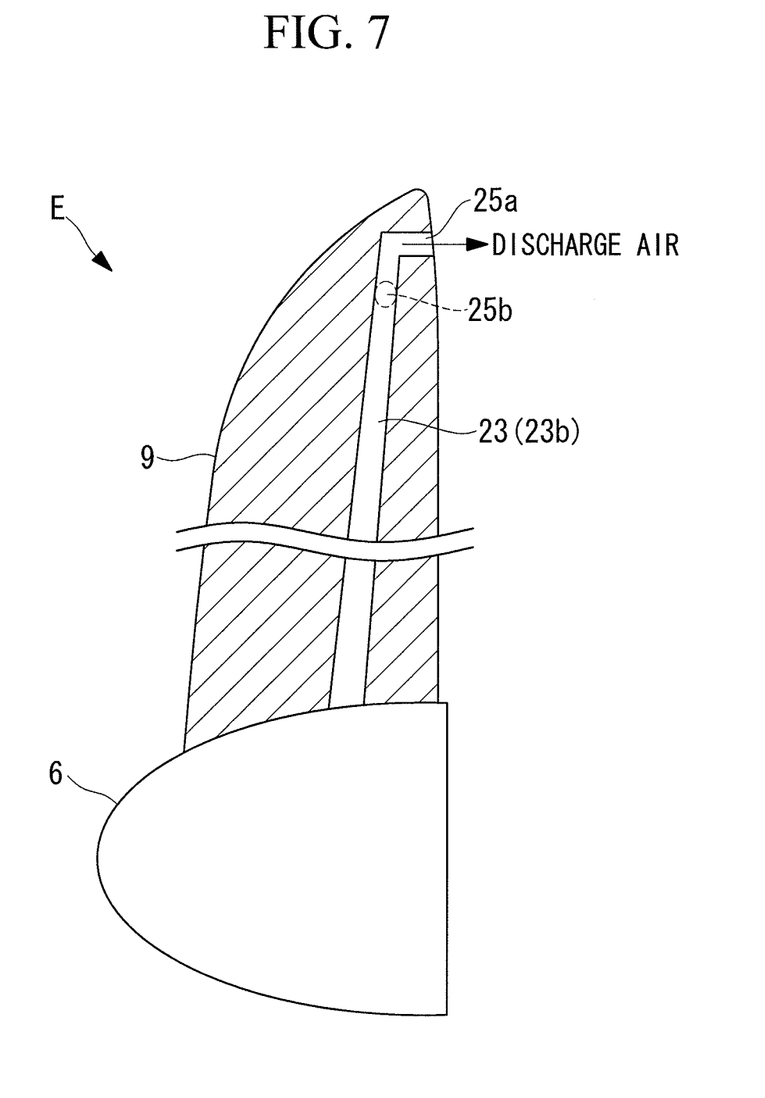
FIG. 7 is a schematic vertical sectional view of a wind turbine blade according to a fifth embodiment of the present invention.

FIG. 7 is a schematic vertical sectional view of the wind turbine blade 9 according to a fifth embodiment of the present invention. The wind turbine blade 9 may be applied to the wind turbine generating apparatuses 1A to 1D according to the first to fourth embodiments. The wind turbine blade 9 includes a cooling structure E. In the cooling structure E, an air outlet of the rotor head cooling air passage 23 (23b) formed inside the wind turbine blade 9 is formed on the leeward side of the wind turbine blade 9 to the wind direction. That is, an air outlet 25a is provided at a trailing edge position of the wind turbine blade 9, or an air outlet 25b is provided at a side surface position thereof, for example. In other words, the air outlets 25a and 25b are preferably provided at a position to which a negative pressure is applied by wind hitting the wind turbine blade 9.

With the cooling structure E, a high negative pressure is applied to the air outlets 25a and 25b of the rotor head cooling air passage 23. Thus, the flow speed and the flow rate of the cooling air that flows through the nacelle interior air passage 18, the rotor head cooling air passage 23, and the tower interior air passage 42 are increased, to thereby improve the cooling efficiency.

Sixth Embodiment

Figure 8:
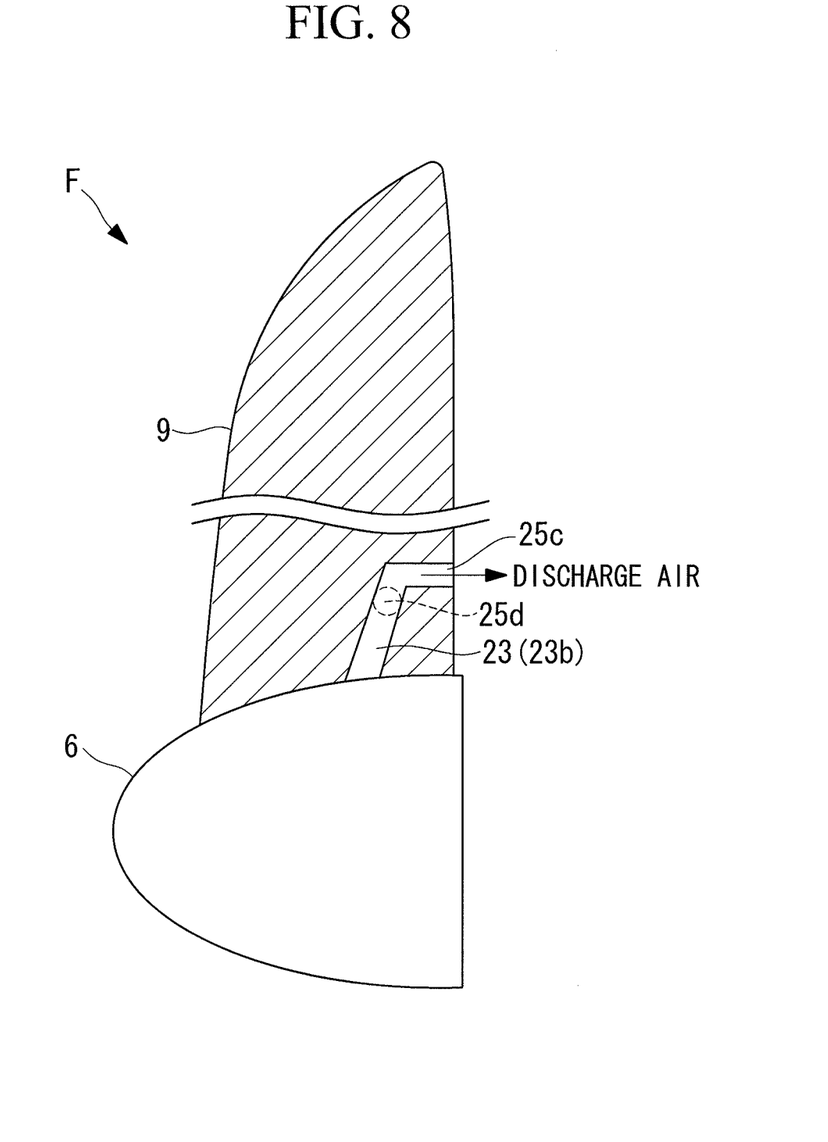
FIG. 8 is a schematic vertical sectional view of a wind turbine blade according to a sixth embodiment of the present invention.

FIG. 8 is a schematic vertical sectional view of the wind turbine blade 9 according to a sixth embodiment of the present invention. The wind turbine blade 9 may be applied to the wind turbine generating apparatuses 1A to 1D according to the first to fourth embodiments. The wind turbine blade 9 includes a cooling structure F. In the cooling structure F, an air outlet 25c of the rotor head cooling air passage 23 (23b) formed inside the wind turbine blade 9 is formed in the vicinity of a root of the wind turbine blade 9. To be more specific, the air outlet 25c is formed in a range of about 0.5 m from the root of the wind turbine blade 9. It is not preferable to provide the air outlet 25c too close to the root from the standpoint of the strength of the wind turbine blade 9. The air outlet 25c is also preferably formed on the leeward side to the wind direction. The air outlet 25d may be provided at a side surface position of the wind turbine blade 9 instead of the air outlet 25c provided at a trailing edge position of the wind turbine blade 9.

With the cooling structure F, the entire length of the rotor head cooling air passage 23 inside the wind turbine blade 9 can be reduced to avoid a pressure loss, and the flow speed and the flow rate of the cooling air can be increased to improve the cooling efficiency.

It goes without saying that the present invention is not limited to the aforementioned first to sixth embodiments. For example, the configurations of the first to sixth embodiments may be appropriately combined together.

REFERENCE SIGNS LIST 1, 1A to 1D Wind turbine generating apparatus
4 Tower
5 Nacelle
6 Rotor head
9 Wind turbine blade
11 Generator
14 Rotor hub (heat generating device)
14a Hub cover
18 Nacelle interior air passage
23 Rotor head cooling air passage
23a, 23b Interior space
23c Communication port
24, 35 Cooling air introduction portion
25 Air outlet
27, 36 Blower fan (air feeding part)
31 Heat pipe (heat dissipation assisting part)
32 Heat dissipation fin (heat dissipation assisting part)
42 Tower interior air passage
A to F Cooling structure

The invention claimed is:

1. A wind turbine apparatus, comprising:
a tower,
a nacelle supported on the tower, said nacelle comprising an outer wall and a closed inner space,
a generator installed inside the closed inner space,
a rotor head and a wind turbine blade attached to the rotor head, wherein
the rotor head is configured to rotate, upon receiving outside wind on the wind turbine blade, and to drive the generator to generate electricity,
the rotor head comprises a rotor hub configured to support the wind turbine blade rotatably in a pitch direction, and a hub cover configured to cover the rotor hub, an interior space formed between the rotor hub and hub cover, and
the wind turbine blade comprises a communication port configured to communicate between the interior space formed between the rotor hub and the hub cover and an interior space of the wind turbine blade, and the wind turbine blade further comprises an air outlet which communicates between the interior space of the wind turbine blade and an outside environment,
a rotor head cooling air passage configured to communicate between the interior space formed between the rotor hub and the hub cover, the communication port and the air outlet,
a cooling air introduction portion configured to allow outside air to flow into the rotor head cooling air passage, and
a nacelle interior air passage defined between the outer wall of the nacelle and the closed inner space and configured to communicate with the rotor head cooling air passage, wherein the nacelle interior air passage is configured to cool outside of the closed inner space and discharge cooling air through the rotor head cooling air passage to the outside environment.

2. The wind turbine apparatus according to claim 1, further comprising:
an air feeding part configured to feed cooling air into the rotor head cooling air passage.

3. The wind turbine apparatus according to claim 1, further comprising:

a heat dissipation assisting part configured to assist dissipation of heat of the rotor hub into cooling air that flows through the rotor head cooling air passage, wherein the heat dissipation assisting part is provided on an outer surface of the rotor hub.

4. The wind turbine apparatus according to claim 1, wherein the air outlet is formed on a leeward side of the wind turbine blade to a wind direction.

5. The wind turbine apparatus according to claim 4, wherein the air outlet is formed in a vicinity of a root of the wind turbine blade.

6. The wind turbine apparatus according to claim 1, wherein
- the nacelle interior air passage is configured to cool the closed inner space of the nacelle, and
- the tower comprises a tower interior air passage configured to cool inside of the tower, the tower interior air passage configured to communicate with the nacelle interior air passage to discharge cooling air passing through the tower interior air passage and the nacelle interior air passage to the outside environment through the rotor head cooling air passage.

* * * * *